United States Patent Office 3,698,914
Patented Oct. 17, 1972

3,698,914
METHOD OF PREPARING TEXTURED SNACK FOOD PRODUCTS
Cornelis Kortschot and Peter F. Adams, Willowdale, Ontario, Canada, assignors to Corporate Foods Limited, Toronto, Ontario, Canada
No Drawing. Filed Jan. 12, 1970, Ser. No. 2,407
Int. Cl. A23l 1/10, 1/12
U.S. Cl. 99—83     5 Claims

ABSTRACT OF THE DISCLOSURE

A process for the preparation of crisp snack foods wherein the food is made into a batter, which is aerated or "foamed" and cast in a thin film prior to cooking. The combination of the aeration step, together with the step of forming a film allows storage of the uncooked food for prolonged periods and rapid cooking to produce a uniform product of good quality.

FIELD OF THE INVENTION

This invention relates to a new process for the manufacture of food products with a controlled texture that may be crisp and friable or chewy. A particular feature of the invention is a method to produce crisp, ready to eat snack foods that may be prepared from a wide range of raw materials ranging from flours to fruit purees.

BACKGROUND OF THE INVENTION

Although the process is suitable for the production of foods with a chewy texture, we are mainly concerned with friable foods. Friable foods have little or no elasticity and break down readily into small, usually irregularly shaped particles during mastication. Examples of these friable foods are many breakfast cereals, baked products such as crackers and many snack foods such as potato chips.

There are many problems associated with the production of snack foods from the natural raw materials. For instance, the production of potato chips from sliced, raw potatoes is affected by the composition of the raw potato. Not all potatoes are suitable and great care is required in storing and so-called conditioning of these potatoes.

An important variable in the composition of the raw potato is reducing sugar content. The reaction of these sugars with amino acids will produce brown discolourations. In the past it was not possible to produce potato chips with acceptable colour from potatoes with a high sugar content. One solution has been to fry the chips in hot oil to a moisture content of 5 or 6% and dry these chips under milder conditions. Drying by means of micro waves has become popular in the U.S. but capital and operating costs are high.

The problem is associated with the fact that in the process of cooking the potato slices in hot oil, the moisture content must be reduced from 75–80% to around 2% while at the same time an acceptable golden colour must be developed. To achieve both objectives in one operation is not always possible when raw material composition changes.

DESCRIPTION OF THE PRIOR ART

Many snacks and cereal products are made by rapidly decompressing the heated material. This is done by the so-called gun puffing of cereals and also by extrusion puffing of for instance corn meal. Decompression results in sudden expansion of the product which creates a porous structure. The expansion is a secondary effect and can only be controlled within certain limits. The resulting air cells are often irregular in shape and large in size.

A number of efforts have been made to produce potato chips from dehydrated potatoes that are worked into a dough and shaped in the form of chips. These dough pieces are then usually dried and finally flash fried. This type of process offers only limited control over porosity and texture. The viscosity of the dough limits the choice of ingredients and control over structure is limited.

Because it is often not possible to produce tender crisp products from a dough, many published procedures call for the addition of shortening to the dough to reduce toughness. However, the addition of a shortening affects the characteristics of the texture in a way that makes the finished product different from a conventional potato chip. The products will tend to have a texture similar to a cracker.

One method described by Rivoche in Canadian Pat. 578,870 (U.S. Pat. 2,791,508) makes use of an irreversible carrier gel. The method as described offers some control over structure but it depends largely on the gel structure to create the desired porosity in the finished product. The major disadvantage of the method as described is that dehydration takes place at high temperature, namely by cooking in oil. Colour development and dehydration take place in one step of the process and we have found that it is often impossible to reduce moisture below 2% and maintain a desired colour.

SUMMARY OF THE INVENTION

In the new process of the present invention, dehydrated or mashed potatoes are used but instead of making this into a dough we make it into a batter that contains as much as 85% water and 15% solids. An advantage of the process is that because of the high moisture content of the batter there are no limitations on the ingredients that can be incorporated into it. It can be prepared from solids such as potato or rice solids or from starches such as tapioca or potato starch. It is also possible to include colloidal materials such as alginates, carboxy methylcellulose or cellulose ether in a fully hydrated state and any number of inert materials such as cellulose powder or inorganic fillers can be used.

DESCRIPTION OF THE PREFERRED EMBODIMENTS

In its simplest form the process of the present invention comprises the steps of:
 (a) Dispersing the foodstuff with suitable edible additives in water to form a fluid batter,
 (b) Aerating the batter,
 (c) Casting the aerated batter into a film, and
 (d) Drying the film to a moisture content between 10 and 30%.

While the resulting uncooked foodstuff may be stored for long periods in an uncooked state, in order to convert it into a crisp ready to eat snack food the dried film is cooked rapidly to a final moisture content of between 1 and 10%. This cooking step can be effected immediately by submerging in hot oil or by toasting at about 350° F.

The batter produced in step (a) should be fluid enough to allow pumping and to allow handling in continuous mixers. It can be de-aerated or aerated with close control using equipment such as the Morton Pressure Whisk or the continuous Oakes mixer, and the number and size of the entrained air bubbles can be regulated. In this aeration step the fluidity of the batter therefor provides a second advantage over existing processes.

A large number of factors affect the texture and eating quality of the finished product. Some of these factors are: Total volume of entrained air, average size and uniformity of air bubbles, thickness of cell walls, solids content of the liquid phase, composition of the liquid phase and the structure of the foam after drying. The difference between an open and a closed cell foam is primarily in the rate of oil absorption during frying, this in turn will affect the appearance of the product. An open cell foam structure will result in a higher oil content and a more translucent chip.

It will be apparent to anyone skilled in the art that the process provides wide latitudes for the adjustment of the above mentioned factors. Whipping agents such as egg or soy proteins and surfactants such as fatty esters can be incorporated to control foaming characteristics, plasticizers such as sorbitol and propylene glycol can be used to change the brittleness of the solid phase in the finished product. In the process of whipping the batter, adjustments can be made in the whipping time, gas pressure and the energy input to create a wide range of specifications.

In one embodiment of the present invention, we have found that a satisfactory potato chip can be made when a batter containing potato and rice solids is whipped in a Hobart mixer using the wire whip. Whipping is continued until a foam density of .88 to .89 is reached. If this mixture is whipped to a density of .65 the walls of the foam tend to fracture during drying resulting in an open celled foam that after frying produces a very tender but rather translucent chip with a high oil content. Tenderness can be reduced by increasing the solids content of the batter and the translucency and oil content can be reduced by incorporating a colloidal material with good film-forming properties in the batter. This would result in more closed cells in the foam.

It should be understood these examples are only given to demonstrate the versatility of the process. The scope of the invention is by no means limited to the examples given.

A third advantage is in forming the chips. When a dough is used it must be sliced or extruded and then usually rolled. In our process a simple casting of the fluid mixture on a solid sheet which may be a continuous belt is sufficient and the thickness can be controlled as desired.

It has been found that casting can be accomplished successfully by using a casting knife with a beveled edge. Either the blade is pulled over a quantity of the batter on a flat sheet or a continuous steel belt is pulled past a casting box riding on the belt. The casting blade forms the front of the casting box and the gap between the belt and the blade, which has a beveled edge, is controlled with two micrometers. Casting thickness can be controlled easily in this manner.

The next step in the process is to dehydrate the batter to a moisture content of 10–30%. This dehydration can be accomplished by any of the known procedures and can be made continuous by the use of drum dryers. We have found the continuous belt dryer manufactured by the American Machine and Foundry Company to be particularly suitable. This equipment is suitable for the drying of flour or starch compositions at high temperatures but can also be used to dry fruit or vegetable puree compositions at lower temperatures.

This equipment consists of a continuous steel belt riding over pulleys at both ends of the machine. A film of foamed material is applied to the belt from a casting box riding on top of the belt at the beginning of the machine. Heat is applied to the belt by a number of steamboxes wherein live steam condenses on the bottom of the belt. The result is fast uniform heat transfer and because heat is applied from the bottom no skin formation or case hardening will slow down the drying process. The top of the belt is enclosed in chambers where air is circulated to remove moisture from the product. The temperature and velocity of this air can be controlled.

Towards the end of the dryer the product can be cooled and is then doctored off the belt as a continuous sheet. This equipment known as the Microflake process is in extensive commercial use in the production of tobacco sheets.

After die cutting the chips from the sheets, the final step of the process is a rapid cooking that may be accomplished by submersion in hot oil or by toasting in an oven. The regulation of the moisture content at the end of the dehydration step will result in proper development of colour in the final cooking step.

Higher moisture will require longer frying or cooking resulting in more colour development. Frying time in oil of 375° F. is about 10 seconds for a potato chip formulation that contains 25–30% moisture after drying.

The advantages of the new process can be summarized by saying that we only accomplish one objective in each step of the process:

In the first step the batter is prepared. Ingredients are rehydrated and homogeneously mixed. If desired, heat can be applied to gelatinize starches. In this step we control viscosity.

In the second step the batter is aerated and a foam with the right characteristics is prepared.

In the third step the foam is dried to a certain moisture content.

In the fourth step the product is cooked in oil or toasted.

Each step can therefore be regulated independently as required and it becomes possible to adjust the process conditions and the material composition as necessary to produce both potato or corn chips and banana or apple chips.

Virtually any raw material is suitable for this process. Flours and starches have been mentioned already. Meat or fish in combination with fillers such as flours or starches can be made into attractive and nutritious products that are suitable for eating as a snack or can become an ingredient in dishes such as dehydrated casseroles. The formula would in the latter case be adjusted to provide the desired texture after rehydration. Soybean concentrates have been formulated into textured products and although these materials would normally result in very tough products, proper adjustment of the aeration can produce tender and friable products.

A variation of the process is to omit the final cooking step. After dehydration the products are stable when the moisture content is low enough. They can be stored at ambient temperatures for extended periods. One product possibility in this class would be a bacon slice that requires no refrigeration and can be fried into its final crisp texture in only 10 seconds. The bacon may be a natural composition or it could be made from a soybean composition with added flavours.

Another possibility is to produce dehydrated chips in a central plant and distribute these to institutional users or franchise holders. The chips would be fried for immediate consumption or fried and packaged for local distribution. This same procedure can be utilized when there is a fluctuating demand for the product. The dryer can operate continuously and dried chips can be stored until demand increases. In this manner only the fryers and packaging equipment will have to be large enough to handle peak demands. This represents a distinct advantage over current procedures resulting in a more scheduled operation and lower production costs.

Example

Potato flour and rice flour are dispersed in water to give a composition that contains 16.03% potato flour, 6.87% rice flour and 77.1% water. The dispersion was accomplished in a "Cowles Dissolver."

The batter is aerated to a density of between .88 and .89 in a Hobart mixer using the wire whip.

The film was cast on the belt of an American Machine Foundry microflake dryer in a thickness of 60 mils and dried in about 4 min. to a moisture content of 25%. The film at this moisture content is pliable and can be handled easily. The film is die cut into oblong shapes of approximately 1½ x 2″ and the pieces are cooked by immersing them in oil at 375° for 10 seconds.

What we claim as our invention is:

1. A process for preparing a crisp snack food which comprises the steps of:
   (a) forming a fluid batter by a dispersing a foodstuff capable of forming a fluid batter with compatible edible additives in water;
   (b) aerating the batter sufficiently to form a foam;
   (c) casting the aerated foam batter into a film;
   (d) drying the aerated foam film to a moisture content of between 10 and 30% by weight;
   (e) breaking up the dried aerated foam film into small particles; and
   (f) cooking the dried aerated foam film particles rapidly for a time sufficient to give a cooked product having a moisture content of between 1 and 10% by weight.

2. A process as claimed in claim 1 in which step (b) is effected by either submerging the dried film particles in hot oil or by toasting them at about 350° F.

3. A process as claimed in claim 1 in which the foodstuff and compatible edible additives comprises potato solids, rice solids and an edible colloid with good film-producing properties.

4. A process as claimed in claim 1 in which the foodstuff and compatible edible additives comprise solids of animal origin, one or more starches and an edible colloid with good film-forming properties.

5. A process as claimed in claim 1 in which the foodstuff and compatible edible additives comprise soybean flour and an edible colloid with good film-forming properties.

References Cited

UNITED STATES PATENTS

| | | | |
|---|---|---|---|
| 3,526,514 | 9/1970 | Gralak et al. | 99—83 |
| 3,259,503 | 7/1966 | Tan et al. | 99—83 |
| 3,539,356 | 11/1970 | Benson et al. | 99—100 P |

RAYMOND N. JONES, Primary Examiner

J. R. HOFFMAN, Assistant Examiner

U.S. Cl. X.R.

99—1, 98, 100 P

UNITED STATES PATENT OFFICE
CERTIFICATE OF CORRECTION

Patent No. 3,698,914       Dated October 17, 1972

Inventor(s) Cornelis Kortschot and Peter F. Adams

It is certified that error appears in the above-identified patent and that said Letters Patent are hereby corrected as shown below:

In the heading insert --

Claims priority of Canadian Application Serial No. 046,458, filed March 21, 1969.

Signed and sealed this 24th day of April 1973.

(SEAL)
Attest:

EDWARD M. FLETCHER, JR.           ROBERT GOTTSCHALK
Attesting Officer                 Commissioner of Patents